Figure 3:
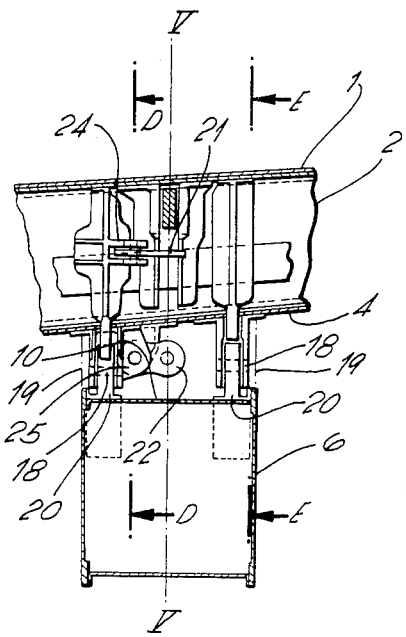

United States Patent [19]

Parkinson et al.

[11] Patent Number: 4,560,122
[45] Date of Patent: Dec. 24, 1985

[54] POWER PLANT ATTACHMENT ARRANGEMENTS FOR AIRCRAFT WINGS

[75] Inventors: Colin C. A. Parkinson; Anthony G. Kinnerly, both of Bristol, England

[73] Assignee: British Aerospace Public Limited Company, London, England

[21] Appl. No.: 569,896

[22] Filed: Jan. 11, 1984

[30] Foreign Application Priority Data

Jan. 12, 1983 [GB] United Kingdom ............... 8300748

[51] Int. Cl.$^4$ ............................................. B64D 27/00
[52] U.S. Cl. ....................................... 244/54; 248/554
[58] Field of Search ................... 244/53 R, 54, 55; 248/554; 60/39.31

[56] References Cited

U.S. PATENT DOCUMENTS

| 3,831,888 | 8/1974 | Baker et al. | 244/54 |
| 3,844,115 | 10/1974 | Fried | 248/554 |
| 4,013,246 | 3/1977 | Nightingale | 248/554 |
| 4,266,741 | 5/1981 | Murphy | 248/554 |

FOREIGN PATENT DOCUMENTS 2010969 7/1979 United Kingdom ............... 244/54

Primary Examiner—Galen L. Barefoot
Assistant Examiner—Rodney Corl
Attorney, Agent, or Firm—Cushman, Darby & Cushman

[57] ABSTRACT

An attachment arrangement for connecting a jet propulsion power plant to an aircraft wing, the power plant lying generally forward and below the wing, wherein the engine is not only anchored in the vertical, lateral and fore-and-aft senses against bodily displacement with reference to the wing, but is anchored against angular movement in its pitch, roll and yaw senses in the event of partial or total failure of any one element of the attachment arrangement.

14 Claims, 20 Drawing Figures

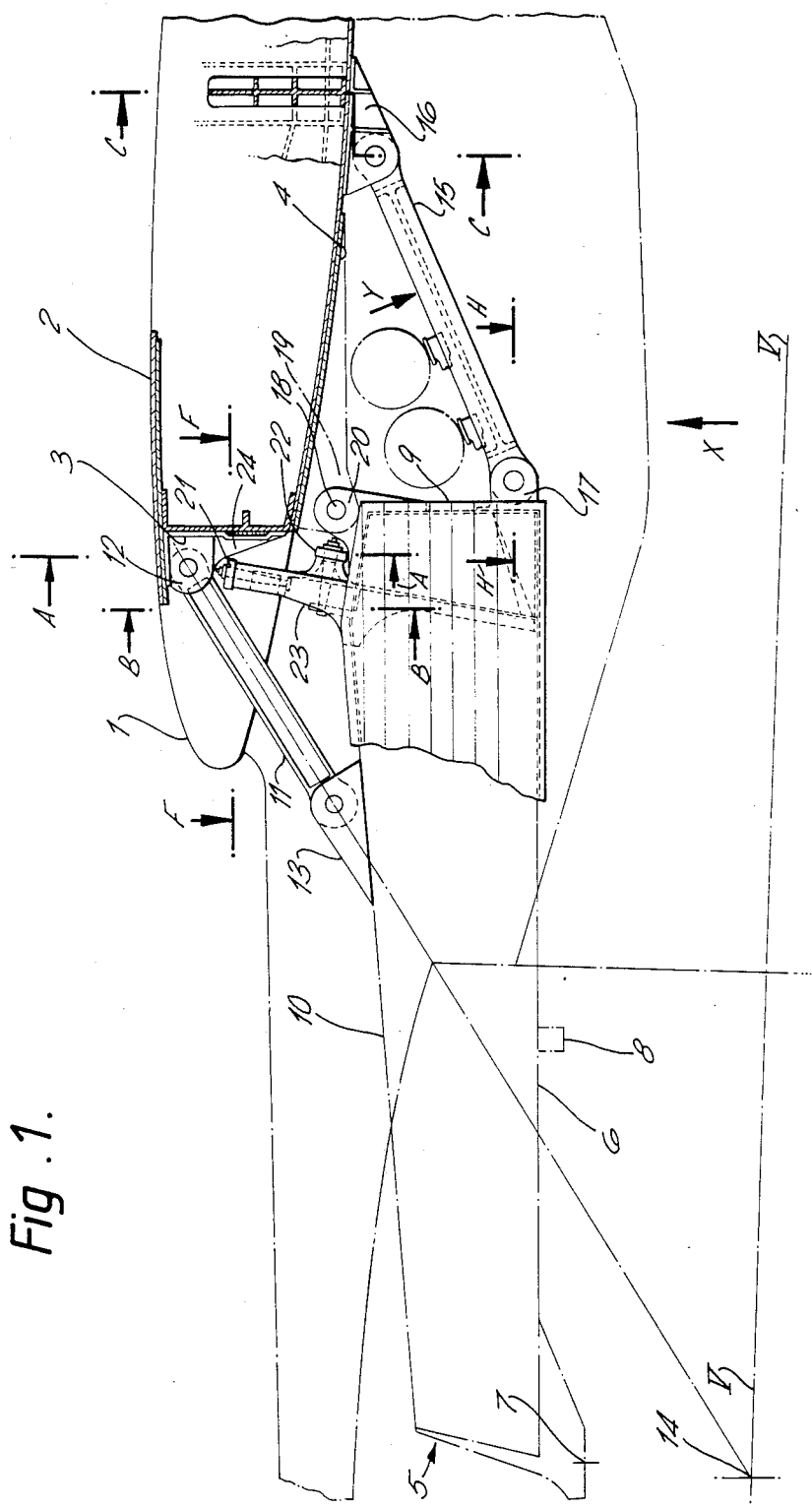

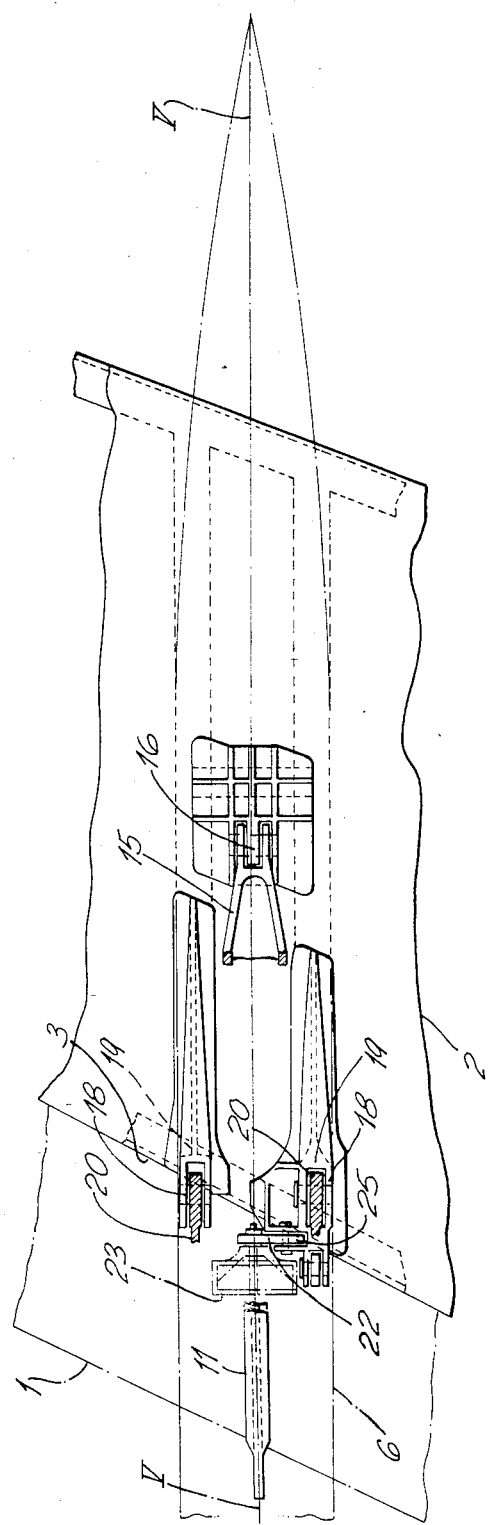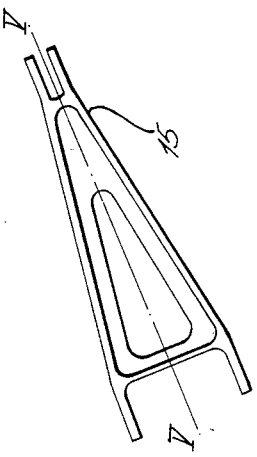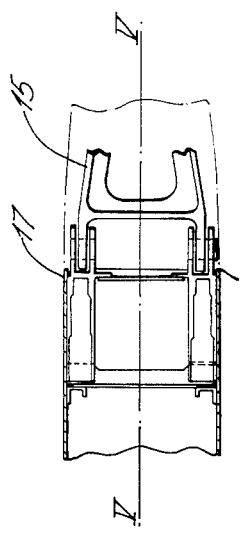

POWER PLANT ATTACHMENT ARRANGEMENTS FOR AIRCRAFT WINGS

This invention relates to power plant attachment arrangements for aircraft wings for use where an engine is carried generally forward and below the wing. The attachment arrangements include a fore-and-aft extending beam member, a spanwise extending structural member of the wing and means interconnecting the spanwise structural member with said beam.

In this specification, those terms relating to disposition or direction assume an aircraft to be in a straight and level flight attitude. Moreover, the aircraft is assumed to be symmetrical about its fore-and-aft, that is to say its longitudinal, axis. The term "spanwise" denotes axes approximately normal to that axis lying in a plane approximating to the plane of the wing.

The invention has for an objective the provision of an attachment arrangement wherein the engine is not only anchored in the vertical, lateral and fore-and-aft senses against bodily displacement with reference to the wing, but is also anchored against angular movement in its pitch, roll and yaw senses in the event of partial or total failure of any one element of the attachment arrangement. In other words, an objective is to provide a fail safe attachment arrangement.

Moreover, it is a further objective of the invention to provide an attachment arrangement in which all structural elements contribute to its load carrying ability in normal use, but in a partial or total failure of any one element are together able to bear any additional loads resulting from that failure.

According to one aspect of the invention, a power plant attachment arrangement for an engine lying generally forward and below an aircraft wing, includes a fore-and-aft extending engine-carrying beam member, a spanwise extending wing structural member, and means interconnecting the two, the interconnecting means including a forward element, pin means pinning respective ends of the forward element to the wing structural member and to the beam member such that the forward element extends downwardly and forwardly with respect to the aircraft wing, a rearward element of A-shape in plan, pin means pinning its apex to the wing structural member and pinning laterally spaced regions of its base to correspondingly spaced regions on the beam member such that the rearward element extends downwardly and forwardly with respect to the aircraft wing, and an intermediate element lying between the forward and the rearward elements comprising pin means pinning laterally spaced regions of the beam member to correspondingly spaced regions of the wing member, the axes of the pin means of the forward element, the intermediate element, and the base of the rearward element all lying generally spanwise with respect to the aircraft.

Where the wing structural member is of box shape in spanwise section, conveniently lug means are provided at an upper region of the forward face of the box to carry the forward element, spaced lug means are provided on the underside of the box adjacent the forward face to carry the intermediate element, and lug means are provided on the underside of the box remote from the forward face to carry the rearward element.

Preferably, the engine-carrying beam member is truncated such that its rearward face lies generally below the forward face of the wing box. In this case, lug means are provided on the beam member on an upper region remote from the rearward face to carry the forward element, spaced lug means are provided on the upper region adjacent the rearward face to carry the intermediate element, and spaced lug means are provided on a lower region of the rearward face to carry the base of the rearward element.

In one embodiment, the A-shaped rearward element has its pin axes at both its base and apex ends parallel to one another. In a further embodiment, the axes are approximately normal to one another.

Figure 4:
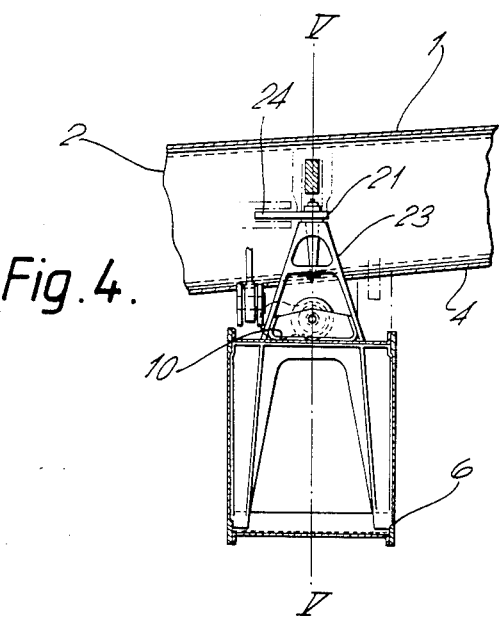
Figure 5:
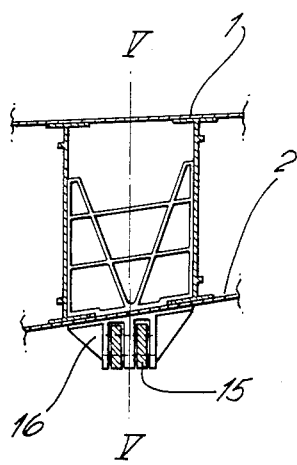
Figure 6:
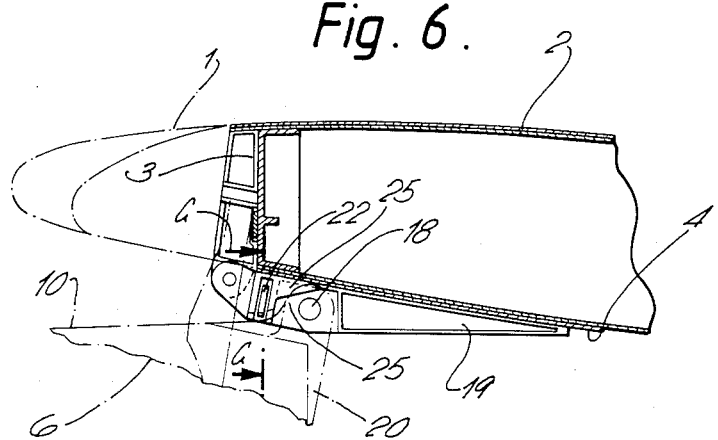
Figure 7:
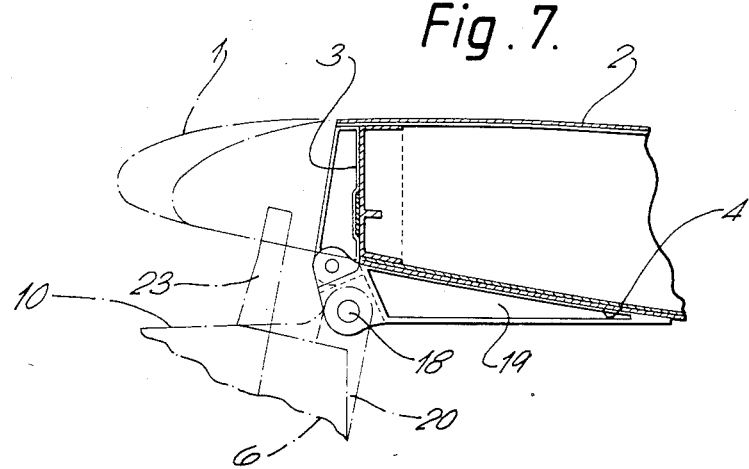
Figure 8:
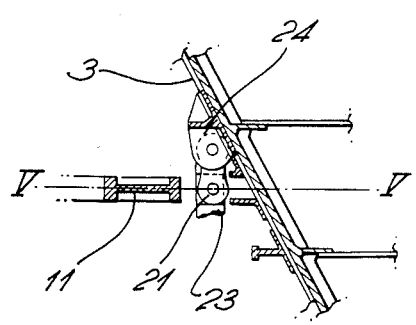
Figure 9:
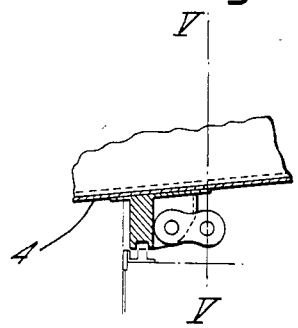
Figure 12:
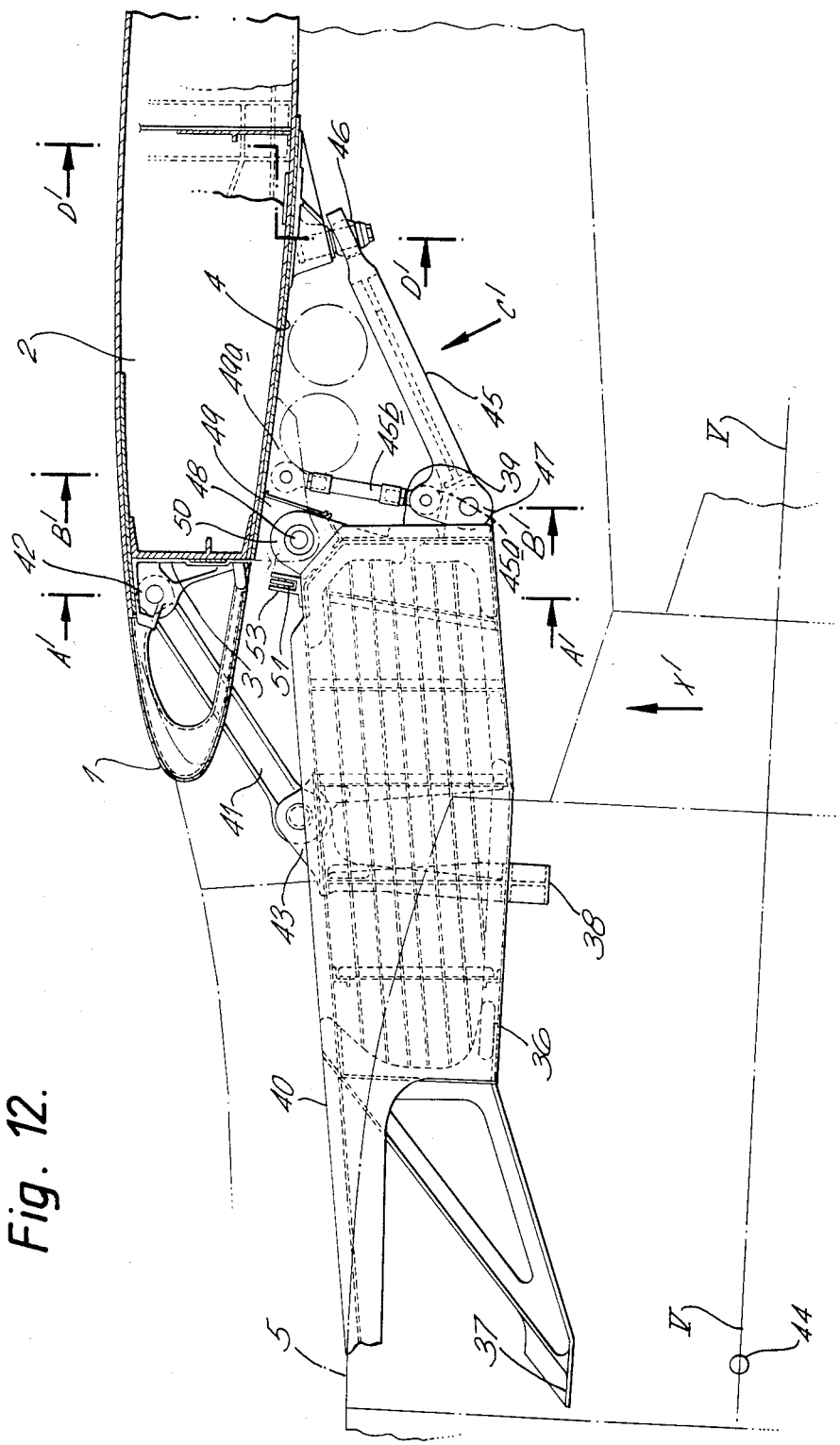
Figure 13:
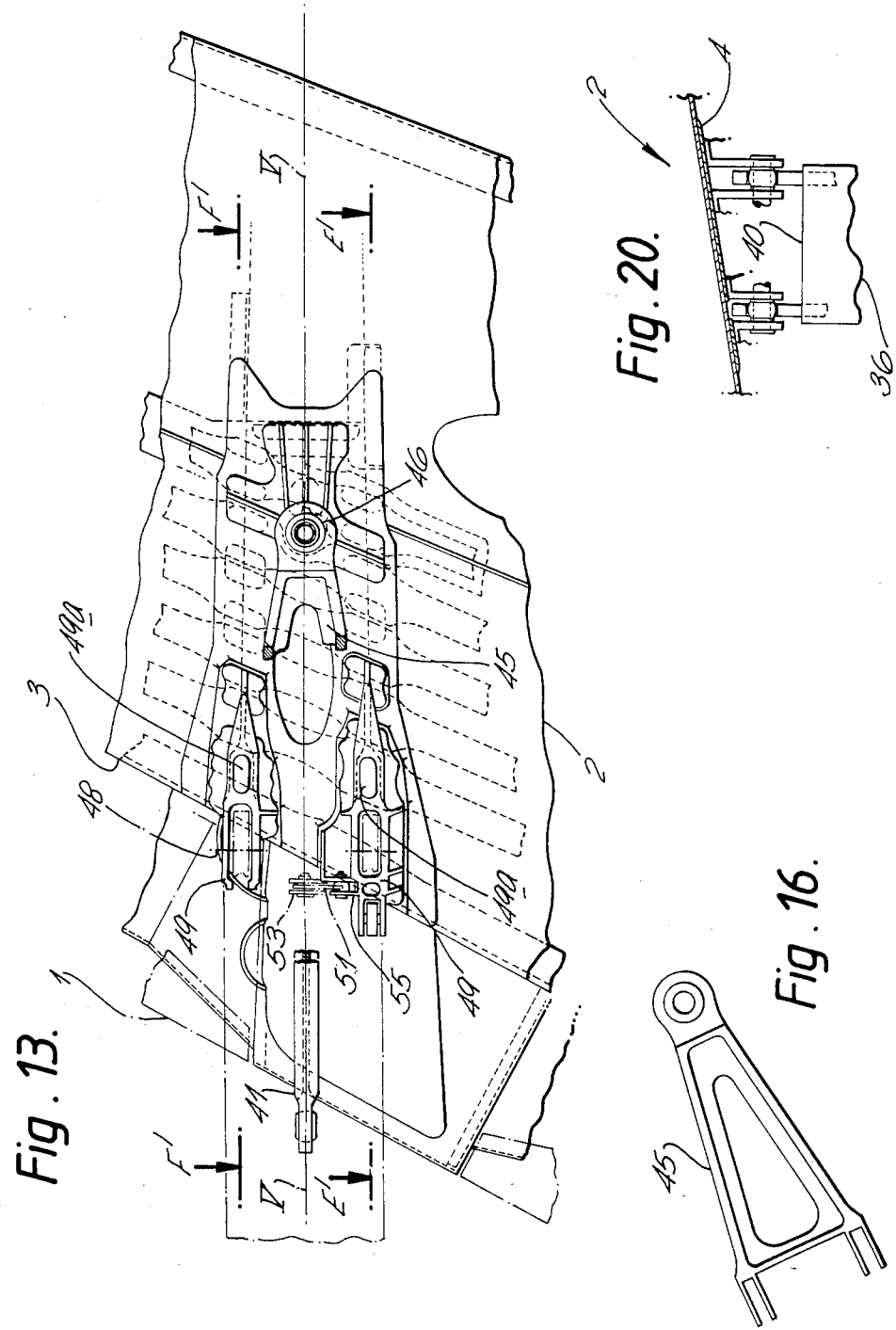
Figure 14:
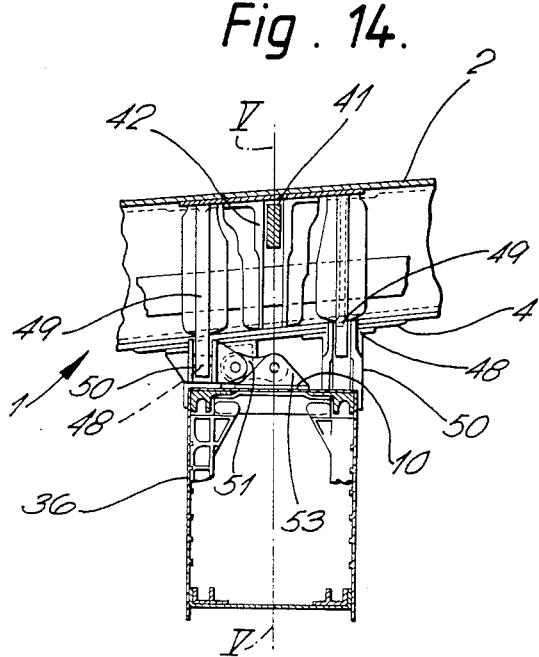
Figure 15:
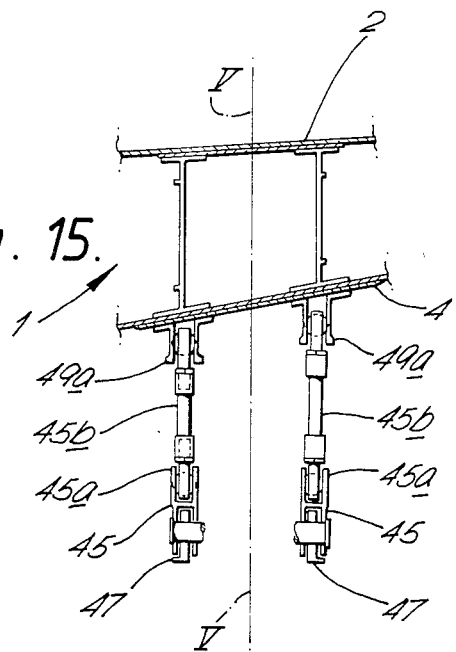
Figure 18:
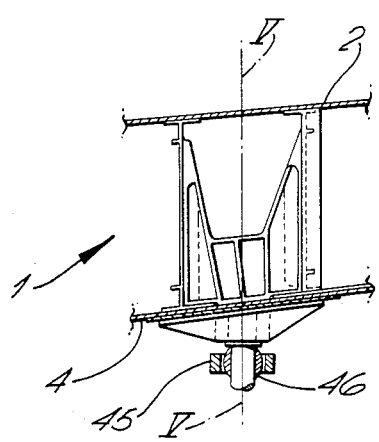
Figure 17:
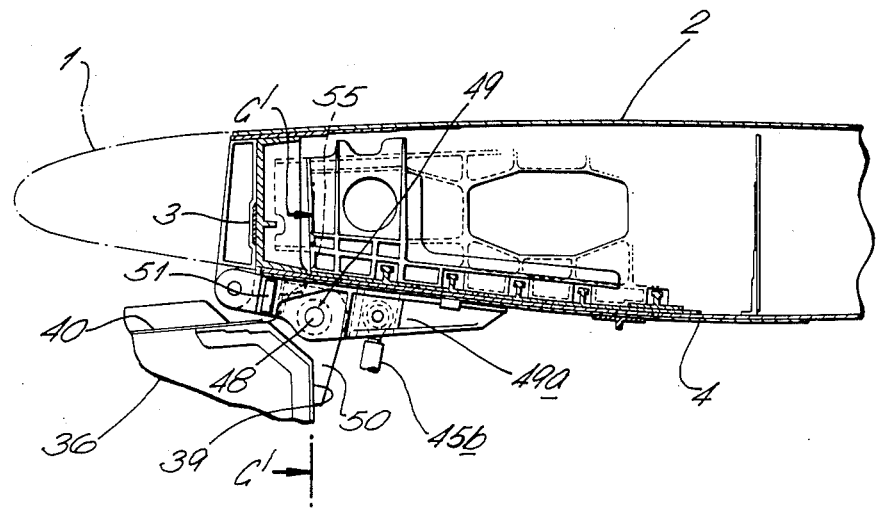
Figure 19:
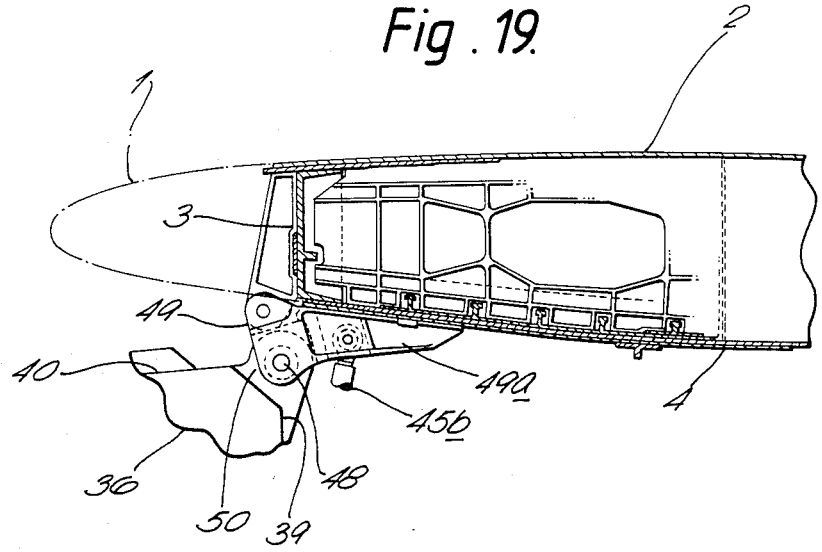

Two embodiments of the invention are described by way of example with reference to the accompanying drawings in which:

FIG. 1 is a partly sectioned side view of a power plant attachment arrangement for an aircraft wing, the section being taken upon the fore-and-aft centre line of the engine, FIG. 2 is an inverted plan view, that is to say, a view on Arrow X of FIG. 1, FIG. 3 is a section on line A—A of FIG. 1, FIG. 4 is a section on line B—B of FIG. 1, FIG. 5 is a section on line C—C of FIG. 1, FIG. 6 is a section on line D—D of FIG. 3, FIG. 7 is a section on line E—E of FIG. 3, FIG. 8 is a section on line F—F of FIG. 1, FIG. 9 is a section on line G—G of FIG. 6, FIG. 10 is a section on line H—H of FIG. 1, FIG. 11 is a view on Arrow Y of FIG. 1, FIG. 12 is a side view of a further power plant attachment arrangement for an aircraft wing, FIG. 13, is an inverted plan view, that is to say, a view on Arrow X' of FIG. 12, FIG. 14 is a section on line A'—A' of FIG. 12, FIG. 15 is a section on line B'—B' of FIG. 12, FIG. 16 is a view on Arrow C' of FIG. 12, FIG. 17 is a section on line E'—E' of FIG. 13, FIG. 18 is a section on line D'—D' of FIG. 12, FIG. 19 is a section on line F'—F' of FIG. 13, and FIG. 20 is a diagrammatic section on line G'—G' of FIG. 17.

Referring to FIGS. 1–11, an aircraft wing 1 includes a spanwise structural member 2 of box-shape in cross-section (a wing box) having a forward face 3 and a lower face or underside 4.

An aircraft power plant 5 (shown generally) includes an engine whose fore-and-aft centre line is shown by line V—V, and a fore-and-aft extending beam member 6 from which the engine depends. The engine is carried at points 7 and 8. The beam member is of truncated form with its rearmost edge region 9 lying generally below the forward face 3 of the wing box even though the forward face 3 of the wing box is swept and the rearmost edge region 9 of the beam member is not swept in this example. The beam member is of generally rectangular shape in cross section, as shown in the cross sections of FIG. 3 and 4; it has an upper surface region 10.

Interconnecting means between the fore-and-aft extending beam member 6 and the spanwise structural member 2 (the wing box) of the wing are provided in the form of a forward element 11 which has one end pinned to lugs 12 projecting from an upper region of the forward face 3 of the wing box and the other end pinned to lugs 13 projecting from the upper surface 10 of the beam member 6 such that the element 11 extends obliquely downwards from the wing to the beam member. The lugs 12 and 13 are positioned such that the axes of their pins are aligned with the centre of gravity 14 of the engine when viewed from the side, as illustrated in FIG. 1. A rearward element of the interconnecting means is provided in the form of an A-shaped frame 15 having its apex end pinned to lugs 16 depending from the underside 4 of the wing box and having its base end pivoted to laterally spaced lugs 17 extending rearwards from a lower part of the rearmost edge region 9 of the beam member.

An intermediate element of the interconnecting means, that is to say that element lying between the forward and the rearward elements, is provided in the form of twin laterally spaced co-axial pins 18 pinning spaced lugs 19 depending from the underside 4 of the wing box, forward of those lugs 16, to further spaced lugs 20 protruding upwards from the junction of the upper part of the rearmost edge region 9 and the rear portion of the upper surface 10 of the beam member.

Yet a further connecting element is provided by twin links 21 and 22 respectively. These are conveniently positioned forward of the pins 18 and of the front face 3 of the wing box but rearwardly of the lugs 13. The links 21 and 22 are each pinned at one end to a member 23 protruding upwards from the beam member. That referenced 21, being pivoted about generally upright axes, is pinned to a lug 24 on the forward face 3 of the wing box, whilst that referenced 22, being pivoted about generally fore-and-aft axes, is pinned to a lug 25 formed upon one of the lugs 19.

Referring now to FIGS. 12 to 20, an aircraft wing 1 includes a spanwise structural member 2 of box-shape in cross-section (a wing box) having a forward face 3 and a lower face or underside 4.

An aircraft power plant 5 (shown generally) includes an engine whose fore-and-aft centre line is shown by line V—V, and a fore-and-aft extending beam member 36 from which the engine depends. The engine is carried at points 37 and 38. The beam member is of truncated form with its rearmost edge region 39 lying generally below the forward face 3 of the wing box even though the forward face 3 of the wing box is swept and the rearmost edge region 39 of the beam member is not swept in this example. The beam member is of generally rectangular shape in cross section, as shown in the cross section of FIG. 14; it has an upper surface region 40.

Interconnecting means between the fore-and-aft extending beam member 36 and the spanwise structural member 2 (the wing box) of the wing are provided in the form of a forward element 41 which has one end pinned to lugs 42 projecting from an upper region of the forward face 3 of the wing box and the other end pinned to lugs 43 projecting from the upper surface 40 of the beam member 36 such that the element 41 extends obliquely downwards from the wing to the beam member. The lugs 42 and 43 are positioned such that the axes of their pins are approximately aligned with the centre of gravity 44 of the engine when viewed from the side as illustrated in FIG. 12. A rearward element of the interconnecting means is provided in the form of an A-shaped frame 45 having its apex end pinned to a part-spherical portion of a pin 46 depending from the underside 4 of the wing box and having its base end pivoted to laterally spaced lugs 47 extending rearwards from a lower part of the rearmost edge region 39 of the beam member. Lugs 45a formed upon the spaced regions of the base end of the A-frame 45 are connected to corresponding lugs 49a depending from the underside 4 of the wing box by means of twin generally upright rods 45b.

An intermediate element of the interconnecting means, that is to say that element lying between the forward and the rearward elements, is provided in the form of twin laterally spaced co-axial pins 48 pinning spaced lugs 49 depending from the underside 4 of the wing box, forward of the pin 46, to further spaced lugs 50 protruding upwards from the junction of the upper part of the rearmost edge region 39 and the rear portion of the upper surface 40 of the beam member.

Yet a further connecting element is provided by a link 51. This is conveniently positioned forward of the pins 48 and of the front face 3 of the wing box but rearwardly of the lugs 43. The link 51 is pinned about generally fore-and-aft axes to a member 53 protruding upwards from the beam member and to a lug 55 formed upon one of the lugs 49.

By these arrangements, the power plant attachments are not handed, that is to say they are interchangeable between the right and left wings of the aircraft, all the pinned joints can have plain bearings, and, as previously discussed, the excess loads occasioned by any single failure of an interconnection element can be absorbed by the remaining elements without further failure; in other words, the attachment arrangement described has fully redundant load paths.

In the arrangement of FIGS. 12–20, the disposition of the A-frame 45 and the rods 45b on the wing box allows these items to be carried by the wing prior to assembly with the beam member 36. Preferably, the part-spherical region of the pin 46 is eccentrically mounted to provide fine positional adjustment when the beam member 36 is connected during assembly.

We claim:

1. A power plant attachment arrangement for an engine lying generally forward and below an aircraft wing, including a fore-and-aft extending engine-carrying beam member, a spanwise extending wing structural member, and means interconnecting the two, the interconnecting means including a forward element, pin means pinning respective ends of the forward element to the wing structural member and to the beam member such that the forward element extends downwardly and forwardly with respect to the aircraft wing, a rearward element of A-shape in plan, pin means pinning its apex to the wing structural member and pinning laterally spaced regions of its base to correspondingly spaced regions on the beam member such that the rearward element extends downwardly and forwardly with respect to the aircraft wing, and an intermediate element lying between the forward and the rearward elements comprising pin means pinning laterally spaced regions of the beam member to correspondingly spaced regions of the wing member, the axes of the pin means of the forward element, the intermediate element, and the base of the rearward element all lying generally spanwise with respect to the aircraft.

2. A powerplant attachment arrangement according to claim 1, in which the interconnecting means includes a further element, and pin means pinning respective ends of the further element to the wing structural member and to the beam member about generally fore-and-aft axes, the element extending generally spanwise with respect to the aircraft.

3. A powerplant attachment arrangement according to claim 2, wherein the wing structural member is of box-shape in spanwise cross section having a forward face and an undersurface, and wherein lug means are provided at an upper region of the forward face of the box to carry the forward element, spaced lug means are provided on the underside of the box adjacent the forward face to carry the intermediate element, and lug means are provided on the underside of the box remote from the forward face to carry the rearward element.

4. A power plant attachment arrangement according to claim 3, wherein the engine-carrying beam member has an upper region and a rearward face, and wherein lug means are provided on a region of the upper face remote from the rearward face to carry the forward element, spaced lug means are provided on the upper region adjacent the rearward face to carry the intermediate element, and spaced lug means are provided on a lower region of the rearward face to carry the base of the rearward element.

5. A power plant attachment arrangement according to claim 2, wherein the pin means pinning the apex end of the rearward element to the wing structural member has its axis lying generally spanwise with respect to the aircraft.

6. A power plant attachment arrangement according to claim 5, wherein the interconnecting means includes another element, and pin means pinning respective ends of said other element to the wing structural member and to the beam member about generally upright axes, said other element extending generally spanwise with respect to the aircraft.

7. A power plant attachment arrangement according to claim 2, wherein the pin means pinning the apex end of the rearward element to the wing structural member has its axis lying approximately upright with respect to the aircraft.

8. A power plant attachment arrangement according to claim 7, wherein the pin means associated with the apex end of the rearward element has that region engaged by said apex end of part-spherical form.

9. A power plant attachment arrangement according to claim 8 including two spaced rod members, and pin means connecting respective ends of said rod members between spaced regions of the base of the A-shaped rearward element and correspondingly spaced regions on the wing structural member, the pin means having their axes lying generally spanwise of the aircraft.

10. A power plant attachment arrangement according to claim 4, wherein the pin means pinning the apex end of the rearward element to the wing structural member has its axis lying generally spanwise with respect to the aircraft.

11. A power plant attachment arrangement according to claim 10, wherein the interconnecting means includes another element, and pin means pinning respective ends of said other element to the wing structrual member and to the beam member about generaly upright axes, said other element extending generally spanwise with respect to the aircraft.

12. A power plant arrangement according to claim 4 wherein the pin means pinning the apex end of the rearward element to the wing structural member has its axis lying approximately upright with respect to the aircraft.

13. A power plant attachment arrangement according to claim 12, wherein the pin means associated with the apex end of the rearward element has that region engaged by said apex end of part-spherical form.

14. A power plant attachment arrangement according to claim 13 including two spaced rod members, and pin means connecting respective ends of said rod members between spaced regions of the base of the A-shaped rearward element and correspondingly spaced regions on the wing structural member, the pin means having their axes lying generally spanwise of the aircraft.

* * * * *